United States Patent
Chandramouleeswaran et al.

(10) Patent No.: US 7,596,688 B2
(45) Date of Patent: *Sep. 29, 2009

(54) APPARATUS AND METHOD FOR USER-DEFINED TUNABLES

(75) Inventors: Aswin Chandramouleeswaran, Santa Clara, CA (US); Steven Roth, Sunnyvale, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 35 days.

This patent is subject to a terminal disclaimer.

(21) Appl. No.: 11/979,257

(22) Filed: Oct. 31, 2007

(65) Prior Publication Data

US 2008/0065876 A1    Mar. 13, 2008

Related U.S. Application Data

(63) Continuation of application No. 10/669,207, filed on Sep. 25, 2003, now Pat. No. 7,302,561.

(51) Int. Cl.
*G06F 1/24* (2006.01)

(52) U.S. Cl. .......................... 713/100; 713/1; 713/164; 717/121; 717/163

(58) Field of Classification Search ............... 713/1, 713/100, 164; 717/121, 163
See application file for complete search history.

(56) References Cited

U.S. PATENT DOCUMENTS

| | | | |
|---|---|---|---|
| 7,167,974 B2* | 1/2007 | Roth et al. ..................... 713/1 |
| 2002/0023211 A1* | 2/2002 | Roth et al. ................... 713/164 |
| 2003/0023707 A1* | 1/2003 | Ryan ........................... 709/220 |
| 2003/0074551 A1* | 4/2003 | Chandramouleeswaran et al. .......................... 713/100 |
| 2004/0003221 A1* | 1/2004 | Millward et al. ............... 713/1 |
| 2004/0237070 A1* | 11/2004 | Roth et al. ................... 717/121 |

* cited by examiner

*Primary Examiner*—Thomas Lee
*Assistant Examiner*—Vincent T Tran

(57) ABSTRACT

A user-defined tunable, and an apparatus and a method for creating the user-defined tunable, are described. The user-defined tunable includes a tunable name, an assigned value, and an expression that relates the user-defined tunable to one or more kernel tunables. The kernel tunables have parameter values defined by the expression, and a change to the expression changes the parameter values of the kernel tunables.

18 Claims, 6 Drawing Sheets

APPARATUS AND METHOD FOR USER-DEFINED TUNABLES

CROSS-REFERENCE TO RELATED APPLICATION(S)

This application is a continuation application of and claims priority to U.S. patent application Ser. No. 10/669,207, filed Sep. 25, 2003, now U.S. Pat. No. 7,302,561 entitled "Apparatus and Method For User-Defined Tunables." The specification of the earlier application is incorporated herein by reference in its entirety.

TECHNICAL FIELD

The technical field is UNIX® operating systems. More specifically, the technical field relates to tools and processes that a system administrator can employ to create tunables, and to adjust the values assigned to tunables.

BACKGROUND

One central component of a computer system operating in a UNIX® environment is an operating system kernel. In a typical UNIX® environment, many applications, or processes, may be running. All these processes use the memory-resident kernel to provide system services. The kernel manages the set of processes that are running on the system by ensuring that each such process is provided with some central processor unit (CPU) cycles when needed, and by arranging for such process to be resident in memory so that the process can run when required. The kernel provides a standard set of services that allows the process to interact with the kernel. In the UNIX® environment, these services are sometimes referred to as system calls because the process calls a routine in the kernel to undertake some specific task. The kernel will then perform the task, and will return a result. In essence, the kernel fills in the gaps between what the process intends to happen and how system hardware needs to be controlled to achieve the process's objective.

The kernel's standard set of services is expressed in a set of kernel modules (or simply, modules). The kernel typically includes modules such as drivers, file system modules, scheduling classes, Streams modules, and system calls. These modules are compiled and subsequently linked together to form the kernel. When the system is started, or "booted up," the kernel is loaded into memory.

The UNIX® environment often employs kernel modules having adjustable parameters. Such adjustable parameters are commonly known as tunables. In current systems, tunables are created, and their default values are set by the kernel developer. In these current systems, the computer system end-user, or system administrator, is able to adjust the values assigned to these tunables, but is not able to create new tunables.

SUMMARY

What is disclosed is a user-defined tunable that includes a tunable name, a tunable description, an assigned value, and expressions that relate one or more kernel tunables to the user-defined tunable. Each of the kernel tunables includes a parameter value defined by an expression. A change to the value of the user-defined tunable changes the parameter value of each of the kernel tunables whose values are expressions involving that user-defined tunable.

Also disclosed is an apparatus that provides user-defined tunables for use in a UNIX® operating system. The apparatus includes a system administrator interface having a user-defined tunable creation option, and a system administrator controlled value assignment option. The apparatus further includes a tunable repository that stores the user-defined tunables, and kernel configuration tools that read the user-defined tunables from the tunable repository and relate the user-defined tunables to a kernel in the UNIX® operating system.

Further, what is disclosed is a method for implementing user-defined tunables in a UNIX® operating system. The method includes the steps of creating a user-defined tunable and, using an expression, relating the user-defined tunable to one or more kernel tunables.

Finally, what is disclosed is a computer-readable medium having code to implement user-defined tunables in a UNIX® operating system. When implemented, the code allows performance of the steps of creating a user-defined tunable and, using an expression, relating the user-defined tunable to one or more kernel tunables.

DESCRIPTION OF THE DRAWINGS

The detailed description will refer to the following figures in which like numerals refer to like items, and in which.

DETAILED DESCRIPTION

In a UNIX® operating environment, kernel modules are provided with developer-provided tunables (referred to hereafter as kernel tunables). The operating system kernel may have a number of kernel modules. Each kernel module may define any number of kernel tunables, with the kernel tunables having tunable parameters, which are integer variables that control the behavior of the module. Kernel tunables are used for a variety of different tasks: some kernel tunables control resource allocations, other kernel tunables control security policies, still other kernel tunables enable optional kernel behavior. A typical kernel may have as many as 200 kernel tunables.

Figure 1:
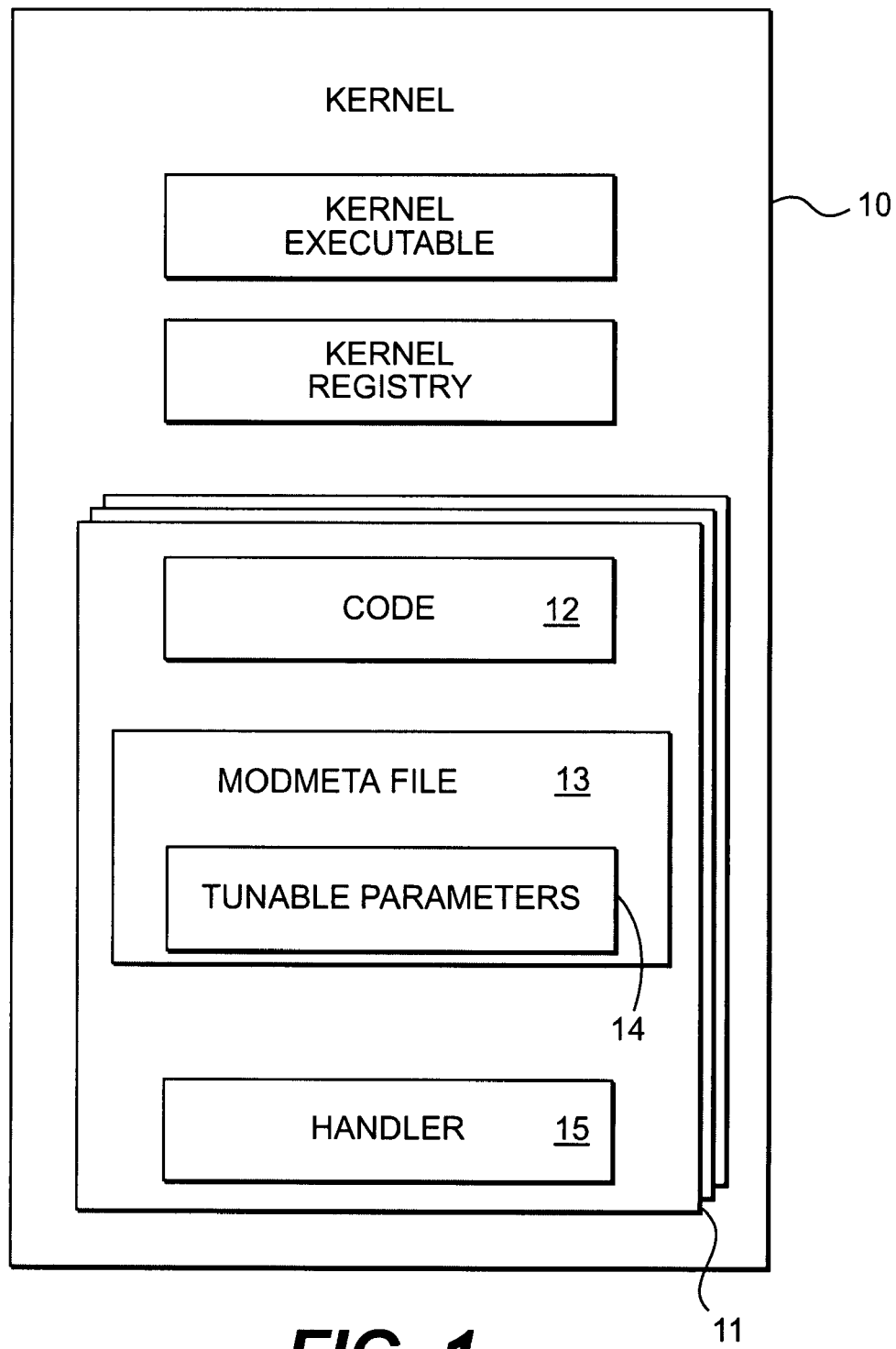
FIG. 1 illustrates a kernel having a number of kernel modules.

FIG. 1 illustrates a kernel 10 having a number of kernel modules 11. Each kernel module 11 includes kernel code 12 and a modmeta file 13. The modmeta file 13 includes tunable parameters 14. The tunable parameters 14 define the kernel tunable. The tunable parameters 14 are initialized by a tunable initialization function, which is part of the kernel code 12. A tunable handler function 15 controls the tunable parameters 14. Some tunable parameters 14 are set by the kernel developer, and cannot easily be changed subsequent to installation of the operating system kernel. Furthermore, the system administrator cannot create kernel tunables.

The kernel 10 also incorporates user-defined tunables (not shown). User-defined tunables are those created by system administrators. One user-defined tunable can be related to another user-defined tunable by way of expressions. User-defined tunables are also used in expressions for one or more kernel tunables and, hence, act as scaling factors. Once these user-defined tunables are established by the system administrator, the system administrator can change one user-defined tunable to modify all related kernel tunables. For example, the system administrator could create a num_databases tunable, and then set several kernel tunables based on its value. A subsequent change to the value of num_databases causes all related kernel tunable values to change as well. In addition, user-defined tunables can be defined by system administrators using tunable names that make sense to the system administrator. Finally, the user-defined tunables act exactly like kernel tunables in kernel configuration tools. Thus, user-defined tunables make the job of kernel tuning easier for the system administrator.

Figure 2:
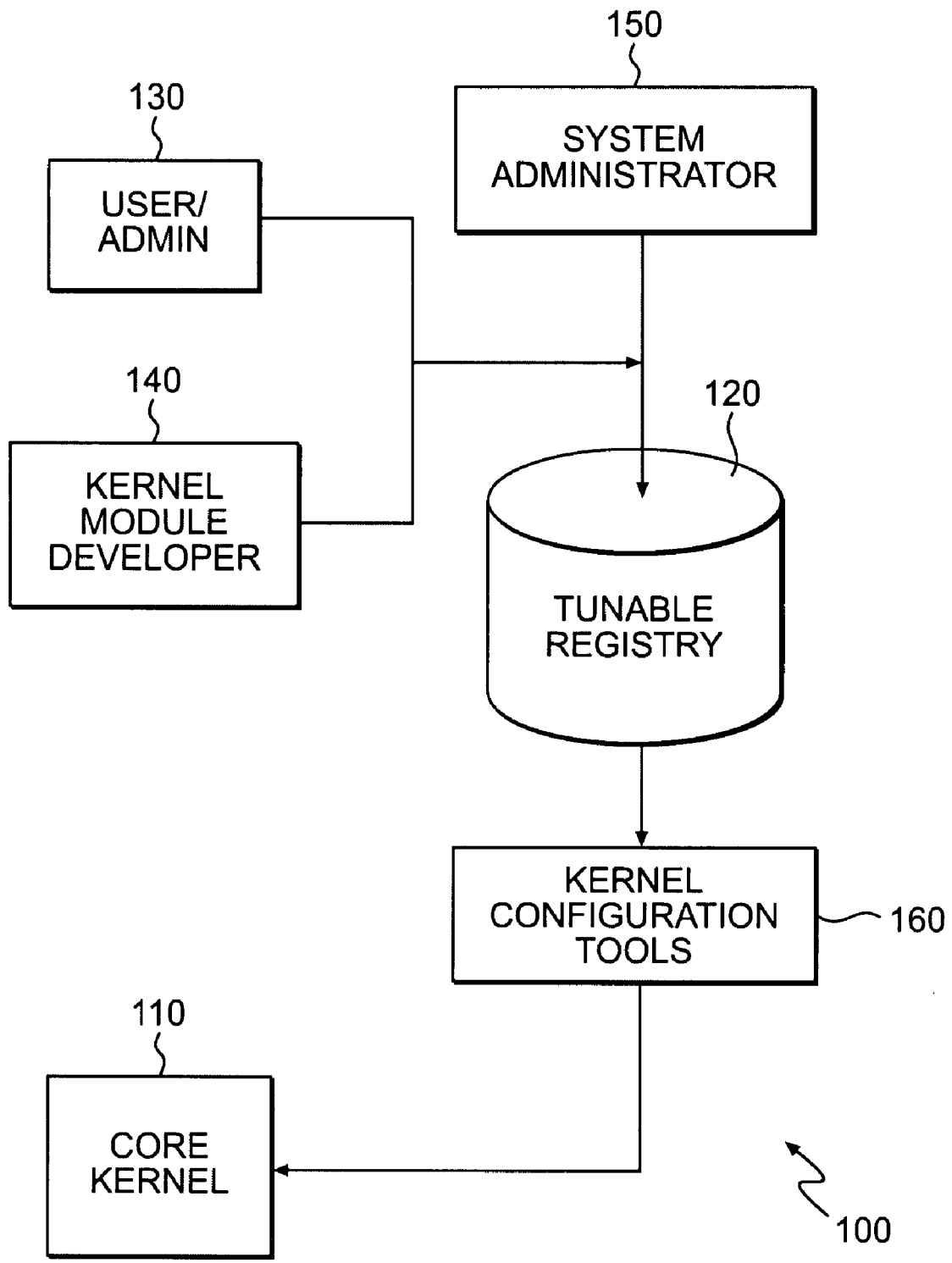
FIG. 2 is a block diagram of an embodiment of a UNIX® environment in which user-defined tunables are implemented.

FIG. 2 is a block diagram of an embodiment of a UNIX® environment 100 in which user-defined tunables are implemented. The environment 100 includes core kernel 110. Associated with the core kernel 110 is tunable repository 120, in which user-defined and kernel tunables are provided. Kernel module developer interface 140 is used to create the kernel tunables that are provided in the tunable repository 120. User/administrator interface 130 is used to create the user-defined tunables that are provided in the tunable repository 120. System administrator interface 150 is used to add expressions to relate user-defined tunables and kernel tunables. The system administrator interface 150 may also be used to change user-defined tunables and to assign values to kernel tunables. In an embodiment, the user/administrator interface 130 and the system administrator interface 150 are the same interface. Finally, kernel configuration tools 160 are used to relate the kernel and user-defined tunables to the core kernel 110. More specifically, the kernel configuration tools read the definitions of the tunables provided in the tunable repository 120, evaluate the expressions that relate the tunables, and provide results to the core kernel 110.

Figure 3:
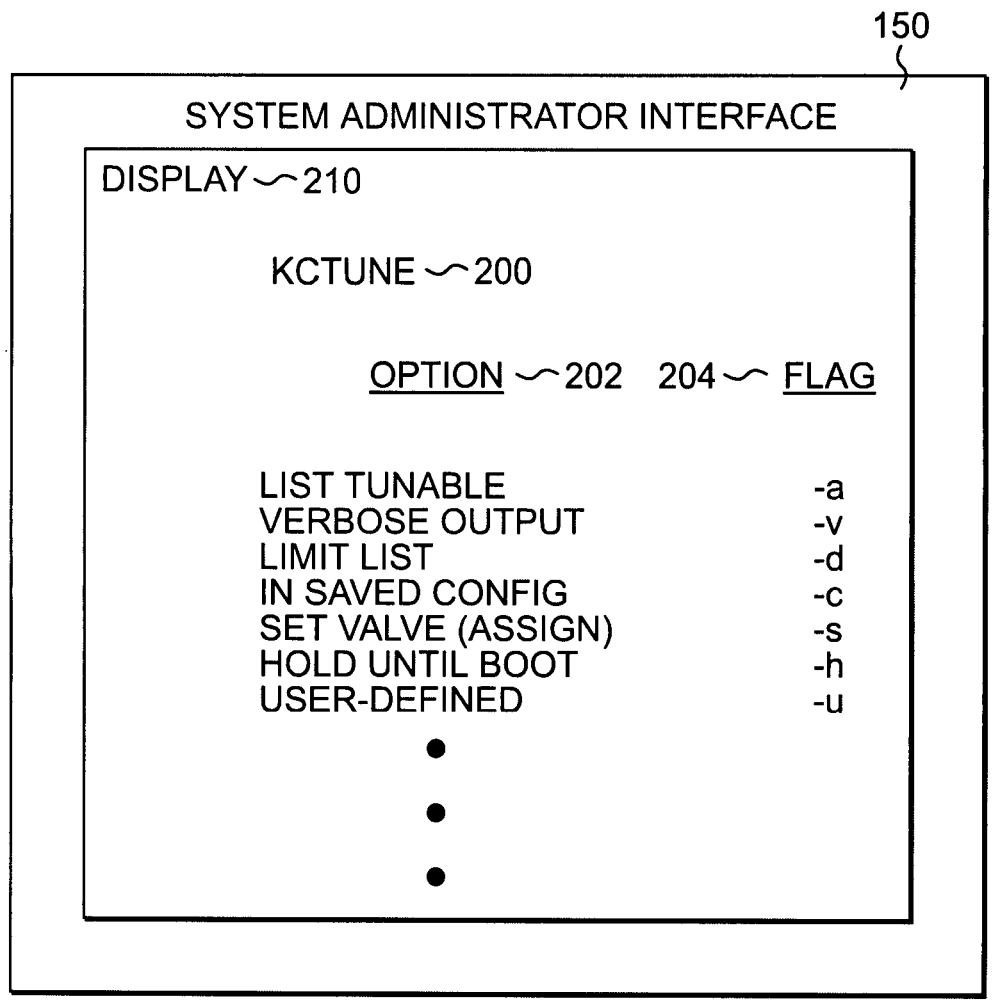
FIG. 3 shows an embodiment of the system administrator interface used in the UNIX® environment of FIG. 2.

The system administrator interface 150 includes the necessary tools to view the user-defined tunables, to change tunable parameters, and to create expressions that relate the user-defined tunables to kernel tunables. FIG. 3 shows an embodiment of the system administrator interface 150. The system administrator interface 150 includes a number of tools that can be used by a system administrator to query and change the values of the user-defined tunables and to change the expressions that relate the user-defined tunables to other tunables. The tools include commands and options that the system administrator uses to create and change user-defined tunables and to change kernel tunables. The options may be indicated to the system through a number of flags. The system administrator 150 also includes a display 210 that allows the system administrator to view a specific tunable, and to view the results of changes to the tunable's parameter values and expressions. The system administrator interface 150 includes a kctune command 200 that allows the system administrator to view, and in some cases to change, kernel and user-defined tunables, current values of the tunables, and expressions that are used to compute the values. Besides kctune, other system administrator interfaces are available to work with tunables. For example, a web-based graphical user interface, kcweb, and a system call, settune( ) for use by programs, are available. The kctune command 200 includes a number of options 202, indicated by flags 204, that allow the system administrator to work with the kernel and user-defined tunables. Examples of options are: list tunables and their values (–a): with verbose output (–v), only tunables with changes held for next boot (–d), in a saved configuration (–c); set a tunable value (assign) (–s); hold change until next boot (–h); and create user-defined tunable (–u). The set tunable value (–s) option may be used by the system administrator to define an expression relating a user-defined tunable to one or more kernel tunables. Other options (not shown in FIG. 3) may include: list tunables including derived tunables, and grouped by module name; set tunables to default values; increment a tunable value; apply change to saved kernel configuration; and make sure a tunable value is at least n.

Using the various kctune command options 202, the system administrator can see that each tunable has a name and a textual description. Each tunable is associated with a kernel module whose name is listed in a verbose output. Tunables can be seen and changed only if they are associated with a module that is installed on the computer operating system, or are user-defined tunables.

When displaying tunable information for the currently running computer operating system, kctune 200 includes the current tunable value and the expression used to compute the value. If changes to the tunable's value are being held for the next system boot, the next boot value and expression are also shown. A verbose listing also shows the tunable's value when the system was last booted.

Tunable values are computed integer expressions, which can refer to other tunable values. The value of a tunable could be 4200, 0x400, or 4*nproc+20. Values and expressions use the syntax of the C programming language. Therefore numbers can be written in decimal, octal, or hexadecimal format.

Kernel tunables can be set to a default value, meaning the system will determine the optimum value for that parameter. In an embodiment, user-defined tunables, if set to default, are removed from the UNIX® operating system.

Tunable values can be assigned based on an expression. For example, user-defined tunable, utunable1, and kernel tunable, ktunable2, may be related by: ktunable2=utunable1*2+100, which means the value assigned to ktunable2 is the value of utunable1 times two, plus 100. Values of other kernel tunable may also be assigned by expressions using utunable1.

User-defined tunables operate in much the same fashion as kernel tunables. To create a user-defined tunable, the system administrator uses kctune 200, but with the –u (user-defined) flag. Subsequent changes to the user-defined tunable involve use of the kctune command 200, but use of the –u flag is not required. To remove the user-defined tunable utunable1, the system administrator uses: kctune–s utunable1=.

Figure 4:
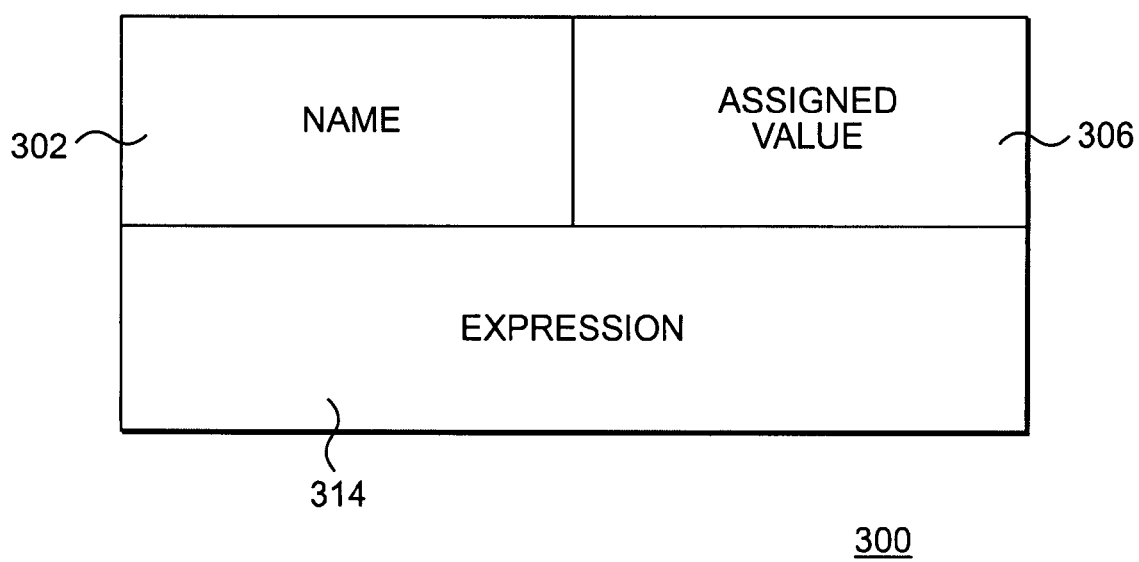
FIG. 4 is a logical diagram of a user-defined tunable.

FIG. 4 is a logical diagram of a user-defined tunable. FIG. 4 shows user-defined tunable 300 including a tunable name 302. The tunable name 302 may incorporate the name of its associated kernel module. The tunable name 302 should be unique as used in the computer system. The user-defined tunable 300 also includes an assigned value 306, which is an integer value. Finally, the user-defined tunable 300 includes an expression 314 that relates the user-defined tunable 300 to other tunables, and in particular to kernel tunables.

Figure 5:
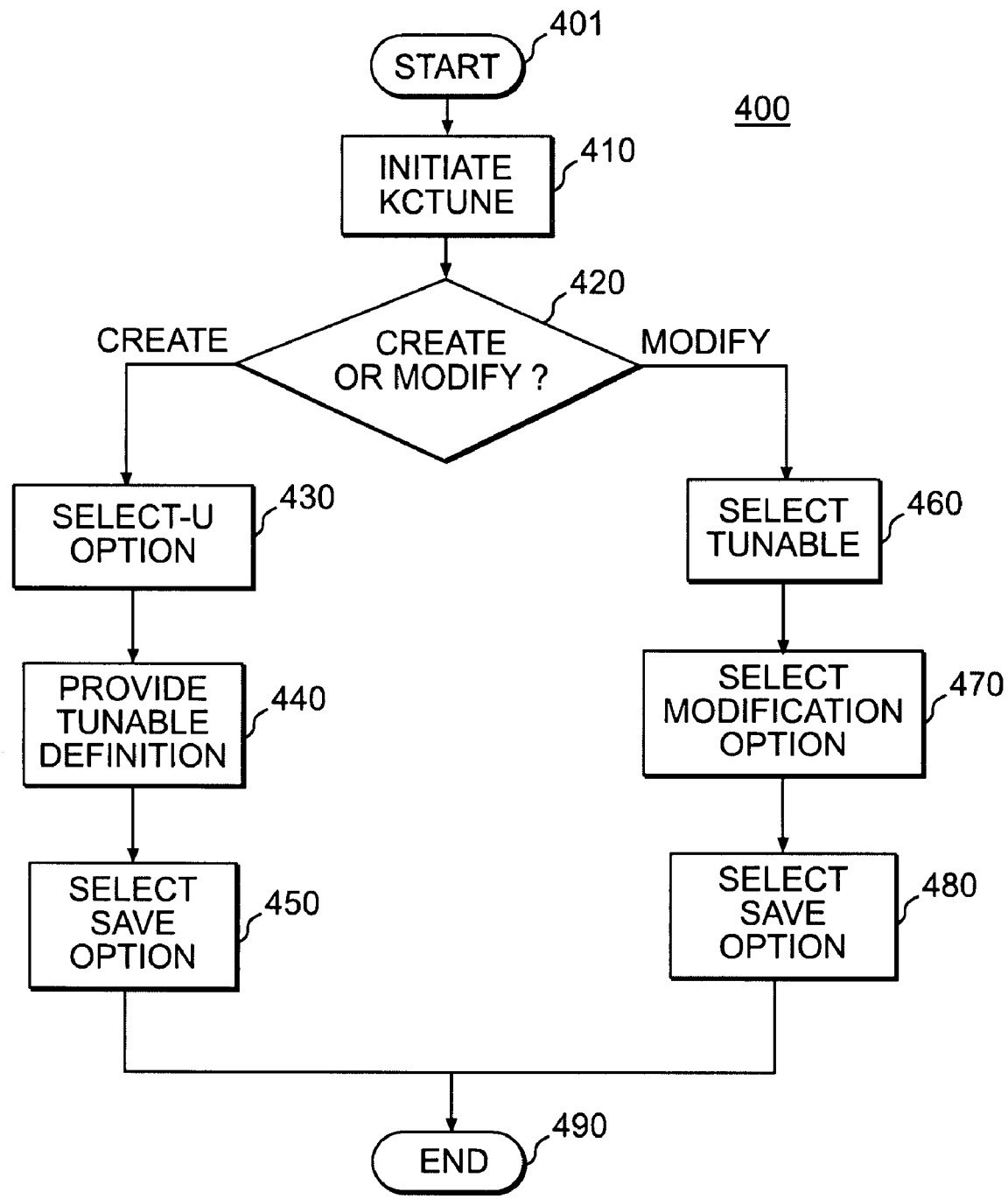
FIG. 5 is a flowchart illustrating a process for implementing user-defined tunables.

FIG. 5 is a flowchart illustrating a process 400 for implementing user-defined tunables. The process 400 begins in block 401. In block 410, the system administrator initializes the kctune command, and depending on the options selected, will be provided with a display of user-defined and kernel tunables. For example, if the verbose flag (–v) is selected, a detailed description of each tunable is provided. In block 420, the system administrator makes a selection to either create a user-defined tunable or to modify an existing tunable. If the system administrator selects create a user-defined tunable, the process 400 moves to block 430 and the system administrator selects the –u flag to initiate creation of the user-defined tunable. In block 440, the system administrator describes the user-defined tunable, including some or all the fields shown in FIG. 3. In block 450, the system administrator selects a save option, such as hold until next boot (–h). The process then moves to block 490 and ends.

In block 420, if the system administrator selects modify an existing tunable, the process 400 move to block 460, and the system administrator designates the tunable to be modified. Using the system administrator interface 150, the system administrator can modify an existing user-defined tunable or an existing kernel tunable. In block 470, the system administrator selects a modification option. For example, the system administrator may select to modify an expression relating a user-defied tunable to one or more kernel tunables. In block 480, the system administrator selects a save option. The process 400 then moves to block 490 and ends.

Figure 6:
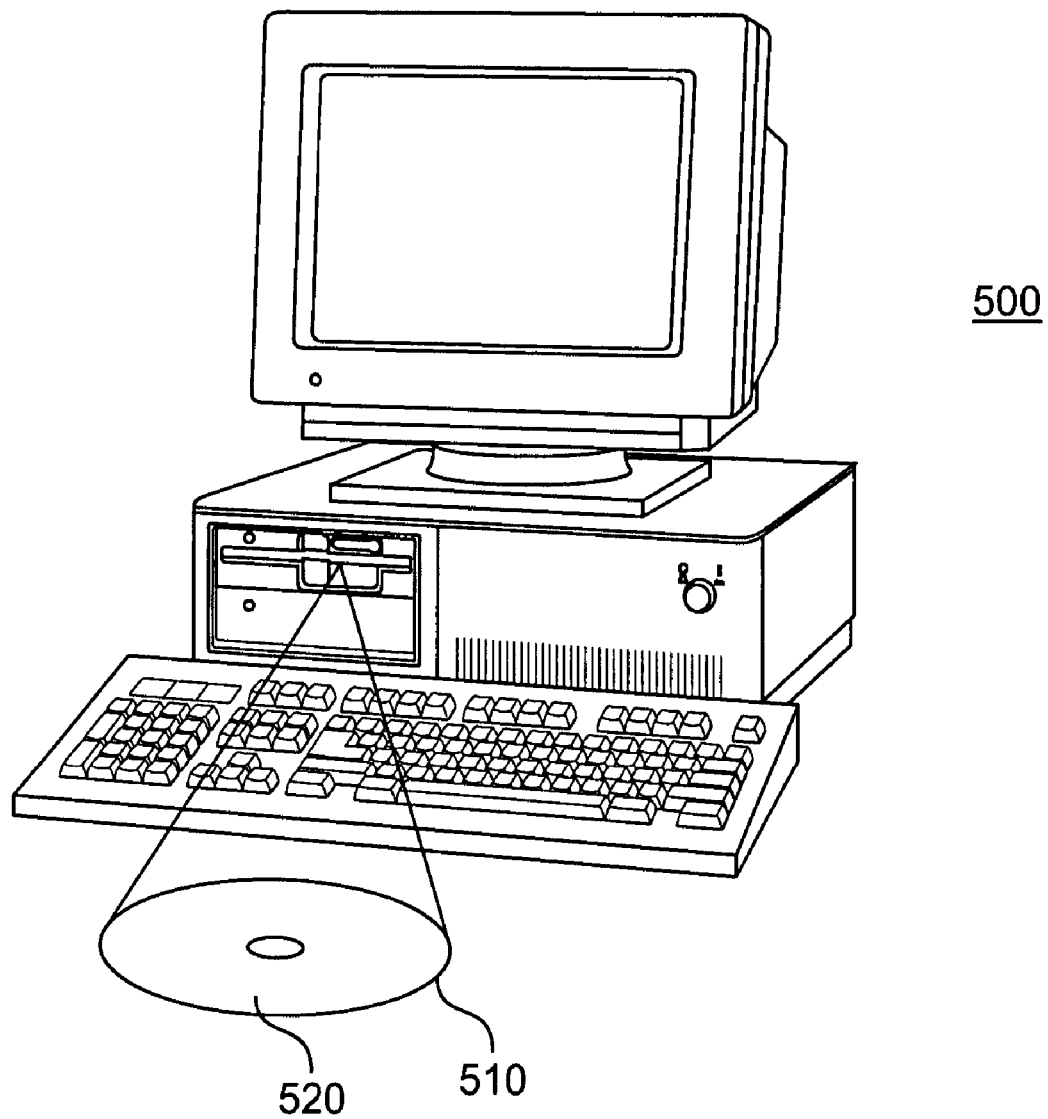
FIG. 6 shows a computer system using a UNIX® operating system, and having the feature of user-defined tunables.

FIG. 6 shows a computer system 500 using a UNIX® operating system, and having the feature of user-defined tunables. To implement user-defined tunables, a computer readable medium 510 is provided with appropriate programming 520, including programming to execute the process 400 shown in FIG. 5. The programming 520 works in conjunction with the installed UNIX® operating system to provide the user-defined tunable functionality.

The computer readable medium 500 may be any known medium, including optical discs, magnetic discs, hard discs, and other storage devices known to those of skill in the art. Alternatively, the programming required to implement the user-defined tunables may be provided using a carrier wave over a communications network such as the Internet, for example.

What is claimed is:

1. A system, implemented on a suitably programmed computing device, for creating user-defined tunables for assignment to a kernel of an operating system, comprising:
    a system administrator interface, comprising:
        a command and options module operable to create and change user-defined tunables and to change kernel tunables,
        a flag module operable to assign flags to one or more options, whereby the flags provide an indication to the kernel;
    an interface module that operates to display the user-defined tunables and the kernel tunables; and
    a storage module that stores the user-defined and kernel modules.

2. The system of claim 1, wherein the command and options module comprises kernel configuration tools operable to change the user-defined and kernel tunables.

3. The system of claim 1, wherein a user-defined tunable comprises:
    a tunable name;
    an assigned value; and
    expressions that relate one or more kernel tunables to the user-defined tunable, each of the kernel tunables having a parameter value defined by an expression, wherein a change to the assigned value of the user-defined tunable changes the parameter value of each of the kernel tunables.

4. The user-defined tunable of claim 3, wherein the expression relating the user-defined tunable to the one or more kernel tunables is of the form of an arithmetic expression involving integers and other tunable names.

5. The system of claim 1, further comprising means for deleting user-defined tunables from the operating system.

6. The system of claim 1, further comprising means for listing one or more kernel tunables and user-defined tunables.

7. The system of claim 6, wherein the means for listing comprises a verbose option, wherein a complete description of the kernel tunables is presented.

8. The system of claim 1, wherein the command and options module comprises a hold option, wherein a user-defined tunable is held until a next boot of the operating system.

9. The system of claim 1, wherein the command and options module comprises a set tunables to default value option.

10. The system of claim 1, wherein the command and options module comprises an increment tunable value option.

11. The system of claim 1, wherein the interface module displays a current tunable value, a tunable expression used to compute the value, and a next boot value.

12. A method, implemented on a suitably programmed computing device, for tuning a kernel of an operating system kernel, comprising:
    starting the operating system, wherein the operating system kernel is accessible;
    within the operating system kernel, configuring one or more user-defined tunables, wherein the user-defined tunables are related to kernel tunables by an expression; and
    changing a user-defined tunable value, wherein a change to the value of the user-defined tunable causes a change to the kernel tunable according to an expression relating the user-defined tunable to the kernel tunable.

13. The method of claim 12, wherein configuring one or more user-defined tunables comprises:
    initializing a kctune command;
    selecting a –u flag to initiate creation of a user-defined tunable;
    describing the user-defined tunable;
    using an expression, relating the user-defined tunable to one or more kernel tunables;
    selecting a flag to initiate creation of the user-defined tunable; and
    selecting a save option, the save option being a hold until next boot option, wherein the user-defined tunable is stored on a storage medium accessible to the operating system.

14. The method of claim 12, further comprising modifying the expression relating the user-defined tunable and the kernel tunable, wherein modifying the expression changes the value of the kernel tunable.

15. The method of claim 12, further comprising:
    creating the expression relating the user-defined tunable and the kernel tunable; and
    relating the expression to the user-defined tunable and the kernel tunable.

16. The method of claim 15, wherein the user-defined tunable is related to a plurality of kernel tunables, and wherein changing the value of the user-defined tunable changes each of the kernel tunables.

17. A computer-readable medium comprising one of a hard disk, an optical disk, and a magnetic disk having programming that, when executed by a suitable computing device, allows tuning of an operating system kernel, the tuning comprising the steps of:
    within the operating system kernel, configuring one or more user-defined tunables, wherein the user-defined tunables are related to kernel tunables by expressions;
    changing a user-defined tunable value, wherein a change to the value of the user-defined tunable causes a change to a kernel tunable according to an expression relating the user-defined tunable to the kernel tunable; and modifying the expression relating the user-defined tunable and the kernel tunable, wherein modifying the expression changes the value of the kernel tunable.

18. The computer-readable medium of claim 17, wherein configuring one or more user-defined tunables comprises:
  initializing a kctune command;
  selecting a –u flag to initiate creation of a user-defined tunable;
  describing the user-defined tunable;
  using an expression, relating the user-defined tunable to one or more kernel tunables;
  selecting a flag to initiate creation of the user-defined tunable; and
  selecting a save option, the save option being a hold until next boot option, wherein the user-defined tunable is stored on a storage medium accessible to the operating system.

* * * * *